United States Patent
Masuda (10) Patent No.: US 11,272,121 B2
(45) Date of Patent: Mar. 8, 2022

(54) TWO-DIMENSIONAL FLICKER MEASUREMENT DEVICE, TWO-DIMENSIONAL FLICKER MEASUREMENT SYSTEM, TWO-DIMENSIONAL FLICKER MEASUREMENT METHOD, AND TWO-DIMENSIONAL FLICKER MEASUREMENT PROGRAM

(71) Applicant: Konica Minolta, Inc., Tokyo (JP)

(72) Inventor: Satoshi Masuda, Neyagawa (JP)

(73) Assignee: Konica Minolta, Inc., Tokyo (JP)

( * ) Notice: Subject to any disclaimer, the term of this patent is extended or adjusted under 35 U.S.C. 154(b) by 38 days.

(21) Appl. No.: 16/641,898

(22) PCT Filed: Sep. 10, 2018

(86) PCT No.: PCT/JP2018/033493
§ 371 (c)(1),
(2) Date: Feb. 25, 2020

(87) PCT Pub. No.: WO2019/069634
PCT Pub. Date: Apr. 11, 2019

(65) Prior Publication Data
US 2020/0267301 A1    Aug. 20, 2020

(30) Foreign Application Priority Data

Oct. 5, 2017   (JP) .............................. JP2017-195104
Oct. 13, 2017  (JP) .............................. JP2017-198964

(51) Int. Cl.
*H04N 5/235*      (2006.01)
*G02F 1/13*       (2006.01)
*G09F 9/00*       (2006.01)

(52) U.S. Cl.
CPC ............. *H04N 5/2357* (2013.01); *G02F 1/13* (2013.01); *G09F 9/00* (2013.01)

(58) Field of Classification Search
CPC .... H04N 5/2357; H04N 7/04; H04N 5/23206; G01J 1/42; G01J 1/44; G01J 2001/4247;
(Continued)

(56) References Cited

U.S. PATENT DOCUMENTS 9,317,757 B2 *   4/2016  Winter ............... G06K 9/00825
2006/0203125 A1 * 9/2006  Sayre .................. H04N 19/154
                                                            348/459

(Continued)

FOREIGN PATENT DOCUMENTS

JP    2003-254860 A    9/2003
JP    2011-163947 A    8/2011
(Continued)

OTHER PUBLICATIONS

PCT Written Opinion of the International Searching Authority issued in PCT/JP2018/033493 dated Nov. 27, 2018.
(Continued)

*Primary Examiner* — Hung H Lam
(74) *Attorney, Agent, or Firm* — Rankin, Hill & Clark LLP (57) ABSTRACT

A two-dimensional flicker measurement device includes: a two-dimensional imaging device having a partial reading function for reading a part of an imaging region; a setting unit that sets a plurality of parts, which correspond to partial regions each of which includes two or more of measurement regions, in the imaging region; a control unit that acquires a photometric quantity of each of the plurality of partial regions corresponding to the plurality of parts by causing the two-dimensional imaging device to image the measurement target multiple times using the partial reading function with (Continued)

the number of set parts as the number of times of imaging; and a calculation unit that executes processing, which is for calculating flicker amounts of the two or more measurement regions included in the partial region based on the acquired photometric quantity of the partial region, for each of the plurality of partial regions.

15 Claims, 7 Drawing Sheets

(58) Field of Classification Search
    CPC ..... G01J 2001/444; G01M 11/00; G02F 1/13; G09F 9/00
    See application file for complete search history.

(56) References Cited

U.S. PATENT DOCUMENTS

| | | | |
|---|---|---|---|
| 2016/0142619 A1 | 5/2016 | Kanda | |
| 2016/0269648 A1* | 9/2016 | Hayashi | ............. H04N 5/23206 |
| 2018/0115743 A1* | 4/2018 | McLoughlin | ............ H04N 7/04 |

FOREIGN PATENT DOCUMENTS

| | | |
|---|---|---|
| JP | 2012-120132 A | 6/2012 |
| JP | 2016-95416 A | 5/2016 |
| KR | 10-2004-0063752 A | 7/2004 |

OTHER PUBLICATIONS

International Search Report (ISR) issued in PCT/JP2018/033493 dated Nov. 27, 2018.
Korean Office Action (KROA) dated Jun. 28, 2021 for corresponding Korean Patent Application No. 10-2020-7009088 and its English translation.
Chinese Office Action (CNOA) dated May 18, 2021 issued in the corresponding Chinese Patent Application No. 201880063611.7 and its English translation.
Japanese Office Action (JPOA) dated Jan. 5, 2022 for corresponding Japanese Patent Application No. 2019-546596 and its English translation.

* cited by examiner

FIG. 12

TWO-DIMENSIONAL FLICKER MEASUREMENT DEVICE, TWO-DIMENSIONAL FLICKER MEASUREMENT SYSTEM, TWO-DIMENSIONAL FLICKER MEASUREMENT METHOD, AND TWO-DIMENSIONAL FLICKER MEASUREMENT PROGRAM

TECHNICAL FIELD

The present invention relates to a technique for measuring the flicker amount of a display screen, for example.

BACKGROUND ART

In order to evaluate the flicker unevenness of a display screen, the flicker amount of each of a plurality of measurement regions (measurement spots) set on the display screen are measured. A spot type flicker measurement device measures the flicker amount of one measurement region by one measurement. In order to measure the flicker amount of each of a plurality of measurement regions set on the display screen using the spot type flicker measurement device, the following method (1) or (2) can be considered. (1) The measurer prepares a plurality of flicker measurement devices, and measures the flicker amount of one measurement region with one flicker measurement device. (2) The measurer prepares one flicker measurement device, and repeats the measurement of the flicker amount with one flicker measurement device while changing a measurement region.

According to a flicker measurement device using a two-dimensional imaging device (for example, Patent Literature 1), it is not necessary to use these methods.

The frame rate of the two-dimensional imaging device can be regarded as a sampling frequency. Therefore, in the case of the two-dimensional imaging device, the frame rate and the sampling frequency differ only in units and the values thereof are the same. When the frame rate is, for example, 128 fps, the sampling frequency is 128 Hz. In order to measure the flicker amount with high accuracy, it is necessary to increase the sampling frequency, but the frame rate (sampling frequency) of a normal two-dimensional imaging device (that is, not a two-dimensional imaging device used in a high-speed camera) is low (for example, 60 fps and 128 fps).

CITATION LIST

Patent Literature

Patent Literature 1: JP 2003-254860 A

SUMMARY OF INVENTION

It is an object of the present invention to provide a two-dimensional flicker measurement device, a two-dimensional flicker measurement system, a two-dimensional flicker measurement method, and a two-dimensional flicker measurement program capable of measuring the flicker amount of each of a plurality of measurement regions set in a measurement target with high accuracy using a two-dimensional imaging device.

In order to achieve the above-described object, a two-dimensional flicker measurement device according to one aspect of the present invention is a two-dimensional flicker measurement device for measuring a flicker amount of each of a plurality of measurement regions set in a measurement target, and includes a two-dimensional imaging device, a setting unit, a control unit, and a calculation unit. The two-dimensional imaging device has a partial reading function for reading a part of an imaging region. The setting unit sets a plurality of the parts, which correspond to partial regions each of which includes two or more of the measurement regions, in the imaging region. The control unit acquires a photometric quantity of each of the plurality of partial regions corresponding to the plurality of parts by causing the two-dimensional imaging device to image the measurement target multiple times using the partial reading function with the number of set parts as the number of times of imaging. The calculation unit executes processing, which is for calculating flicker amounts of the two or more measurement regions included in the partial region based on the acquired photometric quantity of the partial region, for each of the plurality of partial regions.

The advantages and features provided by one or more embodiments of the invention will be fully understood from the detailed description given below and the accompanying diagrams. The detailed description and the accompanying diagrams are provided by way of example only and are not intended as limiting definitions of the present invention.

DESCRIPTION OF EMBODIMENTS

Hereinafter, one or more embodiments of the present invention will be described with reference to the diagrams. However, the scope of the invention is not limited to the disclosed embodiments.

In the diagrams, components denoted by the same reference numerals indicate the same components, and descriptions of the components that have already been described will be omitted. In this specification, in the case of generically referring to a component, the component is denoted by reference numeral with a suffix omitted (for example, a partial region R4). In the case of referring to individual components, the components are denoted by reference numerals with suffixes (for example, partial regions R4-1, R4-2, and R4-3).

Figure 1:
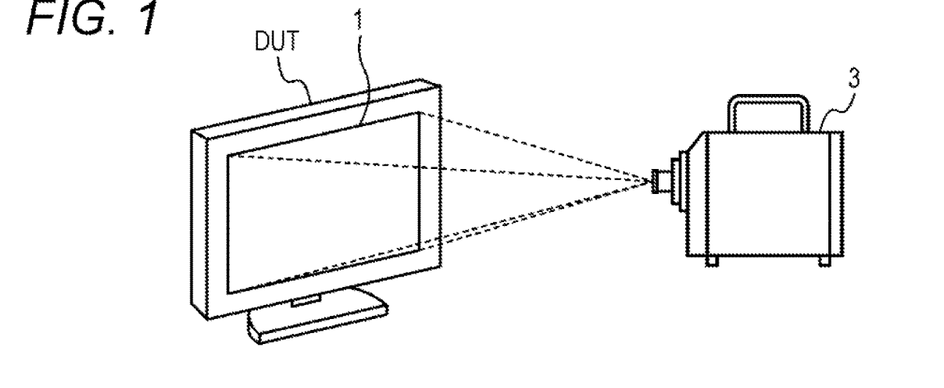
FIG. 1 is a diagram illustrating a relationship between a color display (DUT) having a screen as a measurement target and a two-dimensional flicker measurement device.

FIG. 1 is a diagram illustrating a relationship between a color display (DUT=Device Under Test) having a screen 1 as a measurement target and a two-dimensional flicker measurement device 3. The measurement target has a function of displaying an image. In the embodiment, an explanation will be given with the screen 1 of the DUT (hereinafter, a DUT screen 1) as an example. The measurement target is not limited to the display screen, but may be, for example, a projection screen of a projector.

Figure 2:
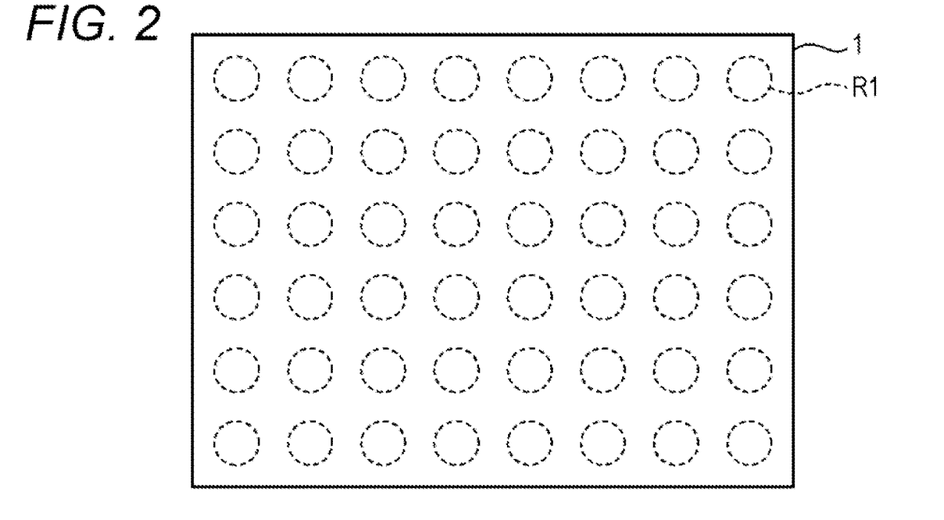
FIG. 2 is a schematic plan view of a DUT screen on which a plurality of measurement regions are set.

The two-dimensional flicker measurement device 3 sets a plurality of measurement regions on the DUT screen 1 based on the instruction of the measurer, and measures flicker amounts for the plurality of measurement regions at the same time. FIG. 2 is a schematic plan view of the DUT screen 1 on which a plurality of measurement regions R1 are set. On the DUT screen 1, 48 measurement regions R1 are set in a two-dimensional manner. The number of measurement regions R1 set on the DUT screen 1 may be plural, and is not limited to 48. The shape of the measurement region R1 (measurement spot) is circular but is not limited thereto, and may be rectangular.

Hereinafter, an example will be described in which the flicker amount is measured using luminance, but a photometric quantity (brightness) may be used. The two-dimensional flicker measurement device 3 calculates a photometric quantity based on an image information signal obtained from the measurement target, and calculates the flicker amount based on the photometric quantity. The photometric quantity is a physical quantity that generically refers to luminance and an image information signal (RAW image data) obtained by imaging the DUT screen 1 (measurement target) by a two-dimensional imaging device provided in the two-dimensional flicker measurement device 3.

As a method of measuring the flicker amount, there are a contrast method and a Japan Electronics and Information Technology Industries Association (JEITA) method. The two-dimensional flicker measurement device 3 can measure the flicker amount using any of the contrast method and the JEITA method.

Figure 3:
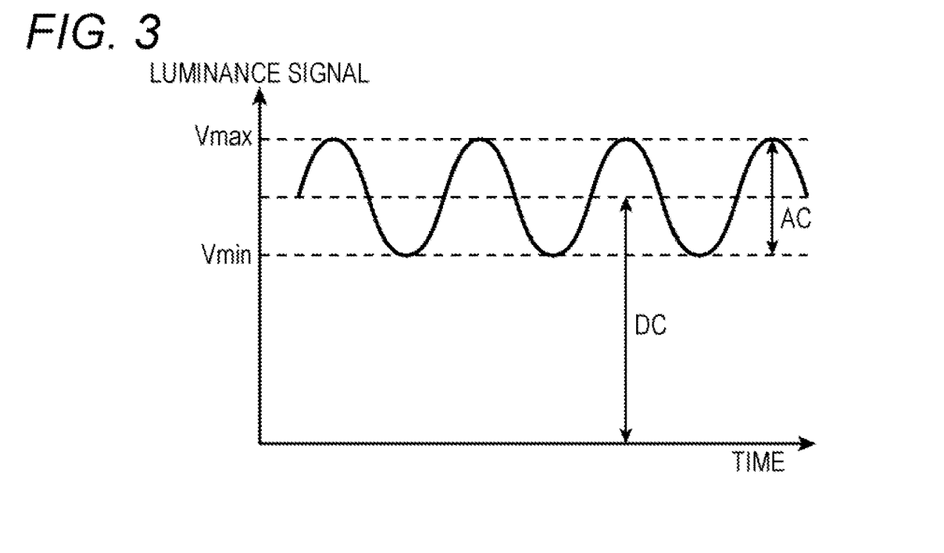
FIG. 3 is a graph showing an example of a luminance signal indicating the luminance of one measurement region.

The contrast method will be described. FIG. 3 is a graph showing an example of a luminance signal indicating the luminance of one measurement region R1. The horizontal axis indicates time, and the vertical axis indicates luminance The luminance signal can be regarded as a signal in which an AC component is superimposed on a DC component. The waveform of the luminance signal is generally a sine curve shape. Assuming that the maximum value of the luminance signal is Vmax and the minimum value is Vmin, Vmax and Vmin are alternately repeated.

The flicker amount based on the contrast method is defined by the following equation.

Flicker amount=AC component AC/DC component DC

Figure 4:
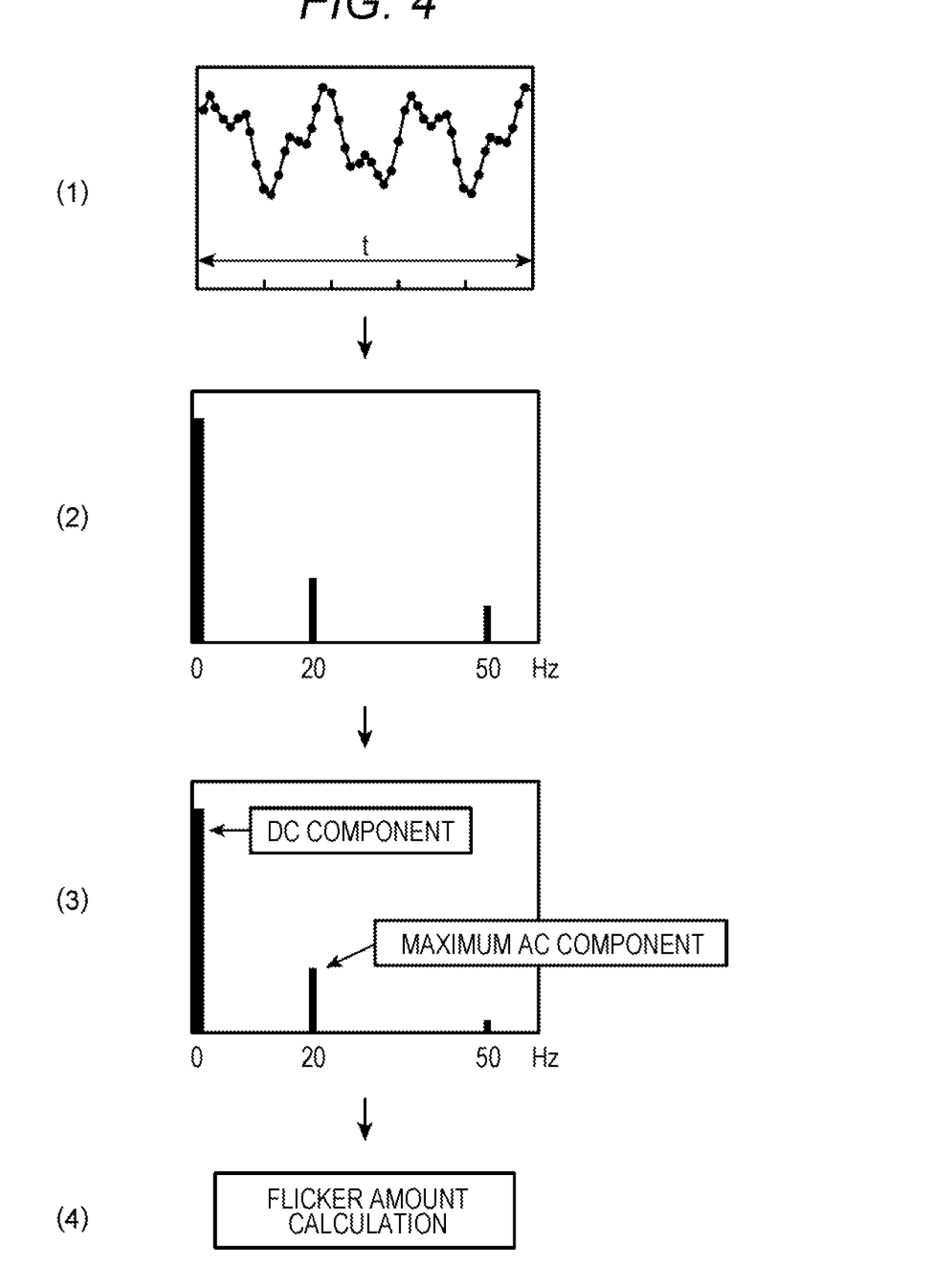
FIG. 4 is an explanatory diagram describing a flicker amount measurement step in a JEITA method.

The JEITA method will be described. FIG. 4 is an explanatory diagram describing a flicker amount measurement step in the JEITA method. FIG. 4A illustrates a step in which the luminance signal is converted from analog to digital. FIG. 4B illustrates a step in which the digitally converted luminance signal is frequency-decomposed by the fast Fourier transform to generate a power spectrum. In this example, frequency components included in the luminance signal are a 0 Hz component (DC component), a 20 Hz component, and a 50 Hz component. FIG. 4C illustrates a step in which the power spectrum is visibility-corrected. FIG. 4D illustrates a step in which the flicker amount is calculated using the DC component and the maximum AC component of the visibility-corrected power spectrum.

Figure 5:
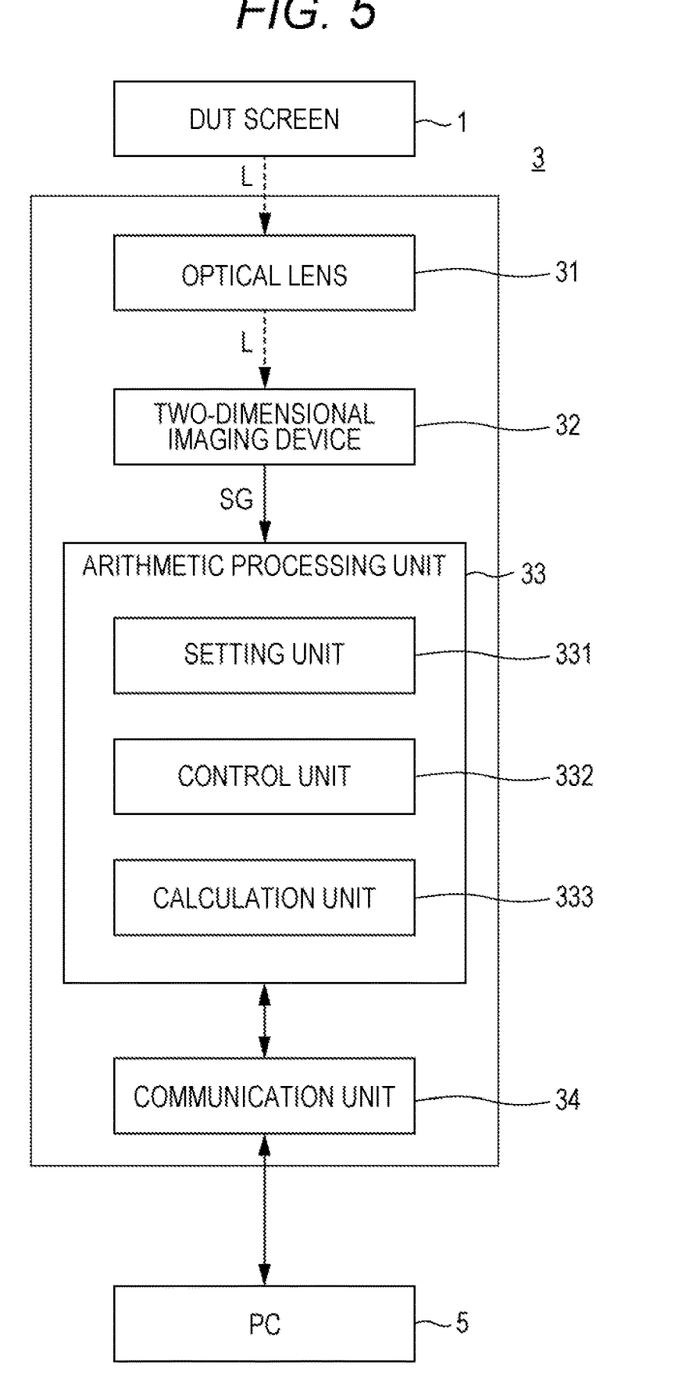
FIG. 5 is a block diagram illustrating the configuration of a two-dimensional flicker measurement device according to an embodiment.

FIG. 5 is a block diagram illustrating the configuration of the two-dimensional flicker measurement device 3 according to the embodiment. The two-dimensional flicker measurement device 3 includes an optical lens 31, a two-dimensional imaging device 32, an arithmetic processing unit 33, and a communication unit 34. The optical lens 31 converges light L from the entire DUT screen 1. The light L converged by the optical lens 31 is received by the two-dimensional imaging device 32.

The two-dimensional imaging device 32 is, for example, a CMOS sensor, and is an image sensor having a two-dimensional imaging region. The two-dimensional imaging device 32 has the same spectral sensitivity characteristics as the visibility characteristics. The imaging region (imaging range, imaging surface) has a structure in which a large number of light receiving elements (a large number of pixels) are arranged in an array. The two-dimensional imaging device 32 images the DUT screen 1 on which an image is displayed at a set frame rate, and outputs a signal indicating luminance information (hereinafter, a luminance signal SG) of the captured image.

Specifically, the two-dimensional imaging device 32 generates an image information signal (luminance signal SG) by imaging the DUT screen 1, on which an image is displayed, at a set frame rate, and outputs the luminance signal SG. The luminance signal SG is a digital electrical signal.

Figure 9:
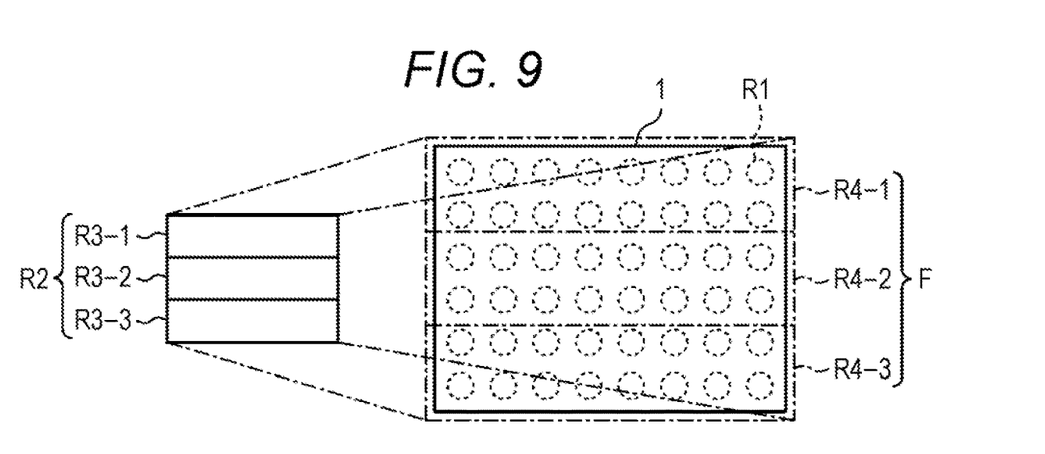
FIG. 9 is an explanatory diagram describing an example of the relationship among the DUT screen, a partial region, an imaging region of the two-dimensional imaging device, and a part of the imaging region.

The two-dimensional imaging device 32 has a partial reading function. In the partial reading, a part of the imaging region of the two-dimensional imaging device 32 is an object to be read. That is, the partial reading means that when the two-dimensional imaging device 32 images the DUT screen 1 on which an image is displayed, data stored in a part of the imaging region of the two-dimensional imaging device 32 is read (as illustrated in FIG. 9 described later, a part R3 of an imaging region R2 corresponds to the partial region R4, and image information of the partial region R4 is stored). According to the partial reading, even the normal two-dimensional imaging device 32 can perform imaging at a high frame rate (for example, 512 fps).

In the case of the two-dimensional imaging device 32, the value of the frame rate becomes a sampling frequency if the unit is changed from fps to Hz. For example, when the frame rate is 512 fps, the sampling frequency is 512 Hz. The luminance signal SG output from the two-dimensional imaging device 32 at 512 fps is a digital signal sampled at 512 Hz. As described above, according to the partial reading, even the normal two-dimensional imaging device 32 can perform imaging at a high frame rate. Therefore, even the normal two-dimensional imaging device 32 can support a high sampling frequency.

The arithmetic processing unit 33 is a hardware processor that executes various settings and calculations necessary for measuring the flicker amount. Specifically, the arithmetic processing unit 33 is a microcomputer realized by a central processing unit (CPU), a random access memory (RAM), a read only memory (ROM), a hard disk drive (HDD), and the like. The arithmetic processing unit 33 includes a setting unit 331, a control unit 332, and a calculation unit 333 as functional blocks. These will be described later.

In addition, some or all of the functions of the arithmetic processing unit 33 may be realized by processing of a field programmable gate array (FPGA) instead of or together with processing of the CPU. Also, similarly, some or all of the functions of the arithmetic processing unit 33 may be realized by processing of a dedicated hardware circuit instead of or together with processing of software.

The arithmetic processing unit 33 includes a plurality of elements illustrated in FIG. 5. Therefore, programs for realizing these elements are stored in the HDD that is hardware for realizing the arithmetic processing unit 33. That is, programs for realizing the setting unit 331, the control unit 332, and the calculation unit 333 are stored in the HDD. These programs are expressed as a setting program, a control program, and a calculation program.

These programs are expressed using the definitions of the elements. The setting unit 331 and the setting program will be described as examples. The setting unit 331 sets a plurality of parts R3 of the imaging region R2, which correspond to the partial region R4 including two or more measurement regions R1, in the imaging region R2. The setting program is a program for setting a plurality of parts R3 of the imaging region R2, which correspond to the partial region R4 including two or more measurement regions R1, in the imaging region R2.

Figure 6:
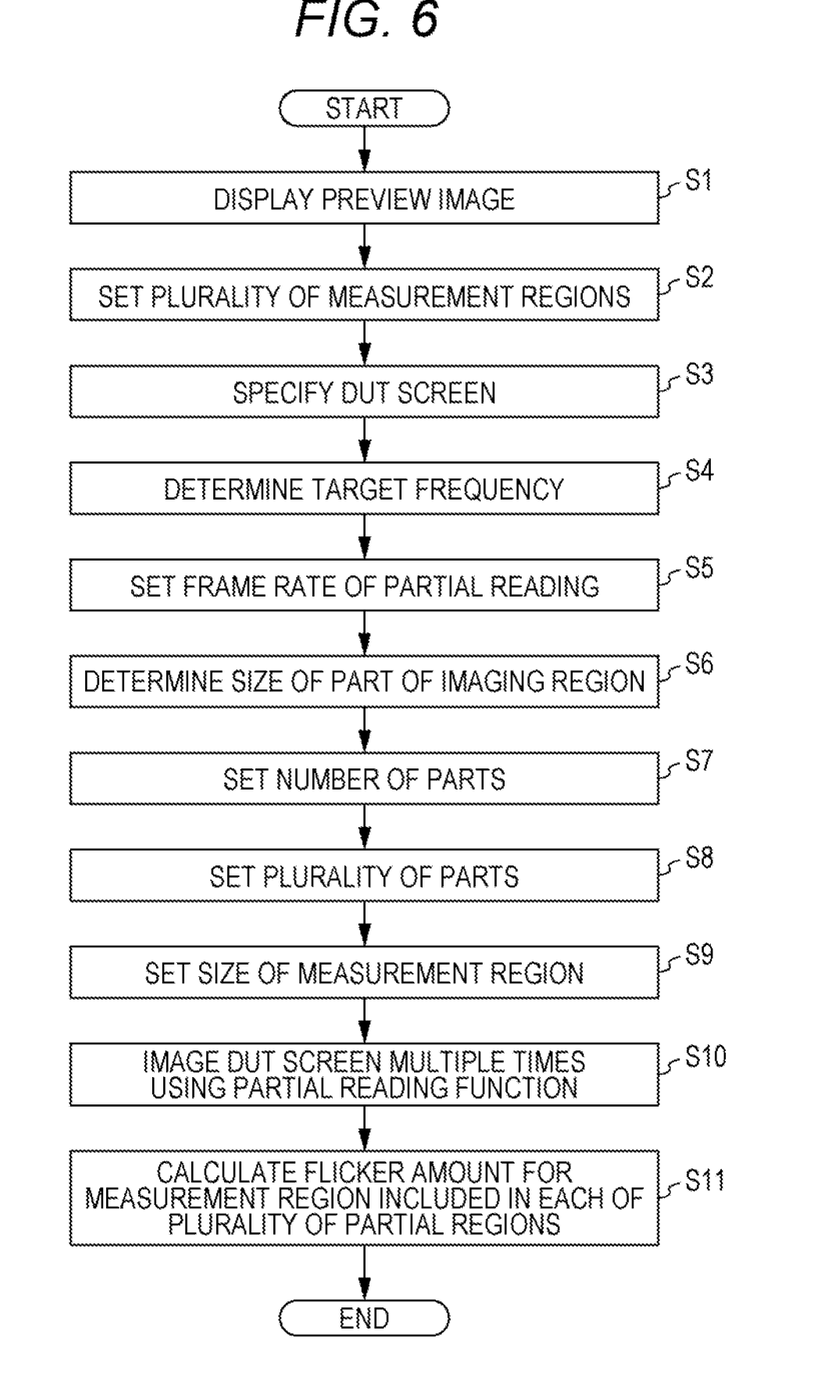
FIG. 6 is a flowchart describing an operation of measuring the flicker amount of each of a plurality of measurement regions set on the DUT screen using the two-dimensional flicker measurement device according to the embodiment.

A flowchart of these programs (a setting program, a control program, a calculation program) executed by the CPU that is the hardware for realizing the arithmetic processing unit 33 is illustrated in FIG. 6 described later.

The communication unit 34 is a communication interface through which the two-dimensional flicker measurement device 3 communicates with an external personal computer (PC) 5. By operating the PC 5, the measurer gives the two-dimensional flicker measurement device 3 an instruction to execute various settings necessary for measuring the flicker amount (for example, designation of the center position of the measurement region R1 and designation of the number of measurement regions R1) and measurement of the flicker amount.

Figure 7:
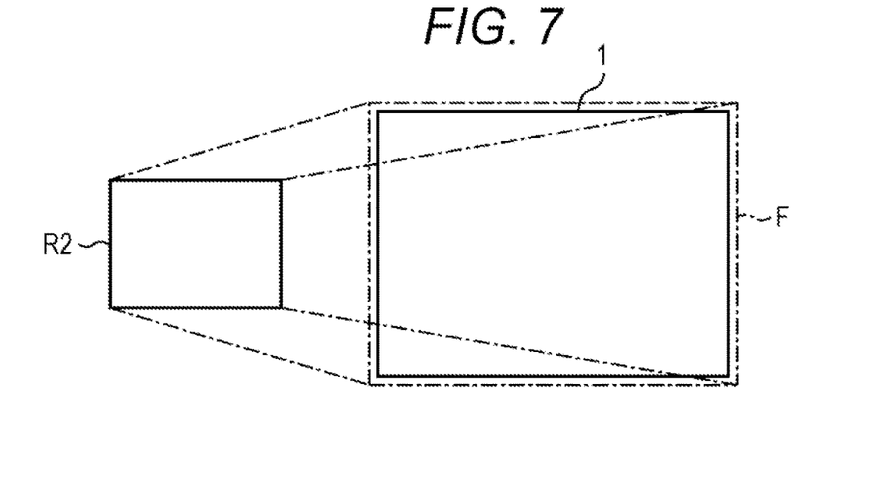
FIG. 7 is an explanatory diagram describing an example of the relationship among the DUT screen, a field of view of the two-dimensional imaging device, and an imaging region of the two-dimensional imaging device.

An operation of measuring the flicker amount of each of a plurality of measurement regions set on the DUT screen 1 using the two-dimensional flicker measurement device 3 according to the embodiment will be described. FIG. 6 is a flowchart describing this. FIG. 7 is an explanatory diagram describing an example of the relationship among the DUT screen 1, a field of view F of the two-dimensional imaging device 32, and the imaging region R2 of the two-dimensional imaging device 32.

Referring to FIGS. 5 and 7, the measurer adjusts the field of view F of the two-dimensional imaging device 32 to the position of the DUT screen 1 on which an image is displayed. The measurer adjusts the focal length of the two-dimensional imaging device 32 so that the field of view F includes the DUT screen 1 and is slightly larger than the DUT screen 1. In this manner, the resolution of the image of the DUT screen 1 formed in the imaging region R2 of the two-dimensional imaging device 32 can be increased.

The measurer operates the PC 5 to input a command for capturing a preview image to the two-dimensional flicker measurement device 3. Then, the control unit 332 causes the two-dimensional imaging device 32 to image the DUT screen 1 on which an image is displayed. The PC 5 displays an image, on which the DUT screen 1 is captured by this imaging, on a screen (not shown) of the PC 5 as a preview image (step S1 in FIG. 6).

Figure 8:
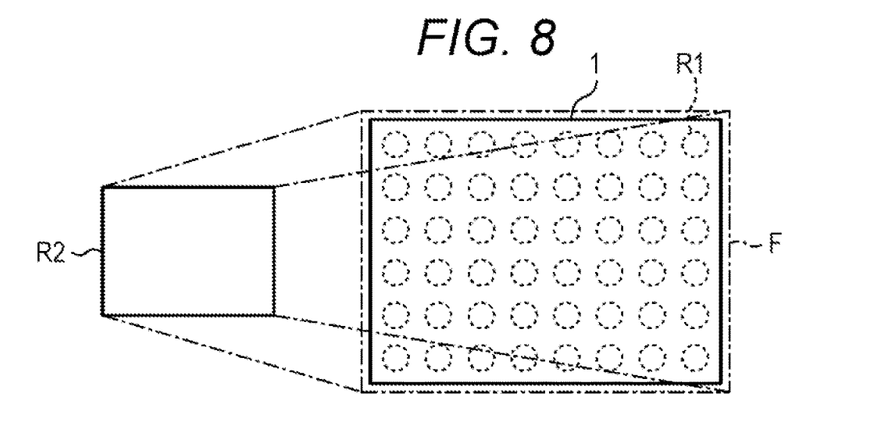
FIG. 8 is an explanatory diagram describing an example of the relationship among a plurality of measurement regions set on the DUT screen, the DUT screen, and an imaging region of the two-dimensional imaging device.

The measurer operates the PC 5 while viewing the preview image to set a plurality of measurement regions R1 on the DUT screen 1 (step S2 in FIG. 6). FIG. 8 is an explanatory diagram describing an example of the relationship among the plurality of set measurement regions R1, the DUT screen 1, and the imaging region R2 of the two-dimensional imaging device 32. 48 measurement regions R1 are set in a matrix within the DUT screen 1. Six measurement regions R1 are set in the vertical direction of the DUT screen 1, and eight measurement regions R1 are set in the horizontal direction of the DUT screen 1. The shape of the measurement region R1 is circular. Adjacent measurement regions R1 are set at intervals therebetween. The number of measurement regions R1 and the setting position and shape of the measurement region R1 are examples, and the present invention is not limited thereto.

Referring to FIGS. 5 and 8, after setting the 48 measurement regions R1 (the plurality of measurement regions R1), the arithmetic processing unit 33 specifies the DUT screen 1 (the image of the DUT screen 1) using the preview image (step S3 in FIG. 6). The arithmetic processing unit 33 specifies the DUT screen 1 by detecting the DUT screen 1 from the preview image using edge detection processing, for example. In addition, the measurer may designate the DUT screen 1 for the preview image displayed on the screen of the PC 5, and the arithmetic processing unit 33 may specify this as the DUT screen 1.

The arithmetic processing unit 33 determines a target frequency (step S4 in FIG. 6). The target frequency is a frequency of a signal necessary for the calculation unit 333 to calculate the flicker amount. The target frequency can be changed depending on a method of measuring the flicker amount. The JEITA method has a step of performing frequency decomposition on the luminance signal SG indicating the luminance of the partial region R4 (fast Fourier transform step). It is preferable to set the frequency of an AC frequency component having the maximum strength, among frequency components included in the luminance signal SG indicating the luminance of the partial region R4, as a target frequency. In the contrast method, there is no step of frequency-decomposing the luminance signal SG indicating the luminance of the measurement region R1. Therefore, the frequency (frequency band) of the luminance signal SG indicating the luminance of the measurement region R1 can be set as a target frequency (the frequency of a frequency component having the maximum strength may be set as a target frequency.)

As a method of determining the target frequency, there are following methods (1) to (3). All are known methods.

(1) The arithmetic processing unit 33 determines a target frequency based on data obtained by frequency analysis of a moving image of a preview image.

(2) The measurer measures the luminance signal SG of the DUT screen 1, on which an image is displayed, using a spot type flicker measurement device, and determines a target frequency based on the luminance signal SG.

(3) The frequency of flicker may be known in advance. For example, it is known that the frequency of flicker generated in a liquid crystal display is twice as high as Vsync. In such a case, the measurer may input the frequency of flicker to the two-dimensional flicker measurement device 3 using the PC 5. The arithmetic processing unit 33 determines the input frequency as a target frequency.

In the cases of (1) and (2), the target frequency can be measured with high accuracy by increasing the sampling frequency used for measuring the target frequency. In the case of the JEITA method, it is preferable to increase the measurement accuracy of the target frequency. In the JEITA method, the luminance signal SG indicating the luminance of the measurement region R1 is subjected to fast Fourier transform to generate a power spectrum, and the flicker amount of the measurement region R1 is calculated based on the power spectrum. Since the power spectrum needs to include a spectrum corresponding to the target frequency, it is necessary to increase the measurement accuracy of the target frequency. On the other hand, in the case of the contrast method, since no power spectrum is generated, it is sufficient that a frequency band including the frequency of flicker can be measured.

The setting unit 331 sets the frame rate (sampling frequency) of partial reading based on the target frequency determined in step S4 (step S5 in FIG. 6). This is a frame rate at which it is possible to reproduce a signal with a target frequency (for example, the luminance signal SG indicating the luminance of each of the 48 measurement regions R1, or, among frequency components included in the luminance signal SG, an AC frequency component having the maximum strength) (hereinafter, referred to as a reproduction frame rate). In addition, a value sufficiently higher than the frequency of the luminance signal SG (for example, 20 times this frequency) or a value sufficiently higher than the frequency of the AC frequency component having the maximum strength (for example, 20 times this frequency) may be set in the setting unit 331 in advance as the frame rate (sampling frequency) of partial reading. According to this, processing for determining the target frequency is not necessary.

The setting unit 331 stores in advance a mathematical expression indicating the relationship between the target frequency and the frame rate of partial reading, and determines the frame rate of partial reading using this mathematical expression. The method for determining the frame rate of partial reading is not limited to this. The setting unit 331 may store in advance a look-up table indicating the relationship between the target frequency and the frame rate of partial reading, and determine the frame rate of partial reading using this table.

In the case of the contrast method, the luminance signal SG can be reproduced by setting the frame rate twice as high as the frequency of the luminance signal SG (target frequency) as the frame rate of partial reading. However, in order to increase the accuracy of the reproduction of the luminance signal SG, preferably, a frame rate that is four times or more the frequency of the luminance signal SG, and more preferably, a frame rate that is eight times or more, is set as the frame rate of partial reading.

In the case of the JEITA method, among frequency components included in the luminance signal SG, in the AC frequency component having the maximum strength, a frame rate that is twice or more this frequency (target frequency) is set as the frame rate of partial reading. Then, when performing a fast Fourier transform on the luminance signal SG to generate a power spectrum, the calculation unit 333 sets an integer to divide the target frequency, among the frequencies of frequency components included in the luminance signal SG, as a frequency pitch of the power spectrum. For example, referring to (3) in FIG. 4, when the target frequency is 20 Hz, any one of 1 Hz, 2 Hz, 4 Hz, 5 Hz, and 10 Hz can be set as the frequency pitch. In this manner, the spectrum of the target frequency 20 Hz can be included in the power spectrum. In addition, the target frequency may be an integer (for example, 20 Hz) or may include a decimal number (for example, 22.4 Hz).

The setting unit 331 determines the size of the part R3 of the imaging region R2 determined by the frame rate of partial reading set in step S5 (step S6 in FIG. 6). Specifically, as illustrated in FIG. 9 described later, the part R3 of the imaging region R2 is a region to be read by partial reading in the imaging region R2.

As the frame rate increases, the size of the part R3 decreases, and accordingly, the size of the partial region R4 decreases. As the frame rate decreases, the size of the part R3 increases, and accordingly, the size of the partial region R4 increases. The setting unit 331 stores in advance a mathematical expression indicating the relationship between the frame rate and the size of the part R3, and determines the size of the part R3, with which the frame rate of partial reading set in step S5 can be realized, using the mathematical expression. The method of determining the size of the part R3 is not limited to this. The setting unit 331 may store in advance a lookup table indicating the relationship between the frame rate and the size of the part R3, and determine the size of the part R3 using this table. In addition, the size of the part R3 may be the number of pixels of the part R3, or may be the area of the part R3. The same applies to the size of the imaging region R2.

The setting unit 331 changes the size of the part R3 in the vertical direction (column direction) with the size of the part R3 in the horizontal direction (row direction) as the size of the imaging region R2 in the horizontal direction, so that the size determined in step S6 is set as the size of the part R3.

The setting unit 331 divides the size of the imaging region R2 by the size of the part R3 determined in step S6, and sets a value obtained by this as the number of parts R3 (step S7 in FIG. 6). Here, the number of parts R3 is set to three. Since the part R3 and the partial region R4 correspond to each other in a one-to-one manner, the number of parts R3 is the same as the number of partial regions R4.

The setting unit 331 sets the addresses of the three parts R3 on the imaging region R2 so that the imaging region R2 is divided into three parts in the vertical direction. As a result, the three parts R3 aligned along the vertical direction of the imaging region R2 are set in the imaging region R2 (step S8 in FIG. 6). In addition, these addresses may be set by operating the PC 5 by the user.

FIG. 9 is an explanatory diagram describing an example of the relationship among the DUT screen 1, the partial region R4, the imaging region R2 of the two-dimensional imaging device 32, and the part R3 of the imaging region R2. The partial region R4 is a region set on the DUT screen 1 by setting the part R3 of the imaging region R2 by the setting unit 331. Since a plurality of parts R3 are set in the imaging region R2, a plurality of partial regions R4 are set on the DUT screen 1. The part R3 and the partial region R4 correspond to each other in a one-to-one manner. In the example illustrated in FIG. 9, three partial regions R4 are set on the DUT screen 1 without a gap therebetween. A part R3-1 corresponds to a partial region R4-1, a part R3-2 corresponds to a partial region R4-2, and a part R3-3 corresponds to a partial region R4-3. An image of the partial region R4 is formed in the part R3 of the imaging region R2, and data (image information signal) read from the part R3 indicates the luminance of the partial region R4.

The partial region R4-1 includes the measurement region R1 on the first line and the measurement region R1 on the second line among the 48 measurement regions R1. The partial region R4-2 includes the measurement region R1 on the third line and the measurement region R1 on the fourth line among the 48 measurement regions R1. The partial region R4-3 includes the measurement region R1 on the fifth line and the measurement region R1 on the sixth line among the 48 measurement regions R1. Therefore, the setting unit 331 sets a plurality of parts R3, which correspond to the partial region R4 including two or more measurement regions R1, in the imaging region R2.

If there is the measurement region R1 that is not included in the partial region R4 among the 48 measurement regions R1 set on the DUT screen 1, the calculation unit 333 cannot calculate the flicker amount of the measurement region R1. In the embodiment, a value obtained by dividing the size of the imaging region R2 by the size of the part R3 of the imaging region R2 is set as the number of parts R3 (step S7 in FIG. 6). For this reason, the DUT screen 1 is virtually equally divided, and each divided part is the partial region R4. In this aspect, since each of the 48 measurement regions R1 set on the DUT screen 1 is included in any of the partial regions R4, the flicker amount can be calculated for all of the 48 measurement regions R1.

In order to calculate the flicker amount of the partial region R4, the frame rate of partial reading needs to be the reproduction frame rate described in step S5. In the embodiment, a value obtained by dividing the size of the imaging region R2 by the size of the part R3 of the imaging region R2 determined by the reproduction frame rate is set as the number of parts R3 (step S7 in FIG. 6). Therefore, it is possible to calculate the flicker amount of the partial region R4, and it is possible to calculate the flicker amount for all of the 48 measurement regions R1 set on the DUT screen 1 as described above.

In addition, the reproduction frame rate only needs to be equal to or higher than the lower limit of the frame rate at which a signal having a target frequency can be reproduced. However, since the frame rate and the size of the part R3 of the imaging region R2 have a negative correlation, the size of the part R3 of the imaging region R2 becomes smaller if the reproduction frame rate is set to be larger than the lower limit. As a result, the number of parts R3 (the number of partial regions R4) increases, and the flicker measurement time increases.

Referring to FIGS. 6 and 9, the setting unit 331 sets the measurement region R1 to a size having a positive correlation with the frame rate of partial reading set in step S5 (step S9 in FIG. 6). The positive correlation means that the size of the measurement region R1 increases as the frame rate increases and the size of the measurement region R1 decreases as the frame rate decreases.

In the imaging region R2, a location where the image of the measurement region R1 is formed is not a single pixel but a plurality of pixels. The calculation unit 333 adds up (binning) the luminance signals SG each indicating the luminance of a region corresponding to each of these pixels, and calculates the flicker amount of the measurement region R1 using the luminance signal SG obtained by the addition. If the strength of the luminance signal SG indicating the luminance of the region corresponding to each of these pixels is low, the SN ratio is low. Accordingly, the measurement accuracy of the flicker amount cannot be increased.

If the frame rate of partial reading is high, the exposure time of the part R3 becomes short. For this reason, when the size of the measurement region R1 is small, the strength of the luminance signal SG obtained by the above addition is low. Therefore, the luminance signal SG having a strength necessary for calculating the flicker amount may not be obtained. On the other hand, if the frame rate of the partial reading is low, the exposure time of the part R3 becomes long. For this reason, even if the size of the measurement region R1 is small, the strength of the luminance signal SG obtained by the above addition is high. Therefore, the luminance signal SG having a strength necessary for calculating the flicker amount can be obtained.

According to the embodiment, if the frame rate of partial reading is high, the size of the measurement region R1 is increased. Therefore, even if the frame rate of the partial reading is high, it is possible to obtain the luminance signal SG having a strength necessary for calculating the flicker amount.

If the number of measurement regions R1 is large, the spatial resolution of the two-dimensional flicker measurement device 3 can be increased. As a result, it is possible to evaluate the flicker unevenness of the DUT screen 1 more accurately. According to the embodiment, if the frame rate of partial reading is low, the size of the measurement region R1 is reduced. Therefore, when the frame rate of partial reading is low, the number of measurement regions R1 can be increased, so that the spatial resolution of the two-dimensional flicker measurement device 3 can be increased.

In the case of the JEITA method, after step S9, the setting unit 331 sets the imaging time. As will be described later, the DUT screen 1 is imaged three times. This imaging time is one imaging time. This is the time during which the number of frames required to perform a fast Fourier transform on the luminance signal SG indicating the luminance of the partial region R4 is obtained. In addition, in the case of the contrast method, a predetermined imaging time may be set in the setting unit 331, or the measurer may operate the PC 5 to input the imaging time to the two-dimensional flicker measurement device 3 so that the imaging time is set in the setting unit 331.

Figure 10:
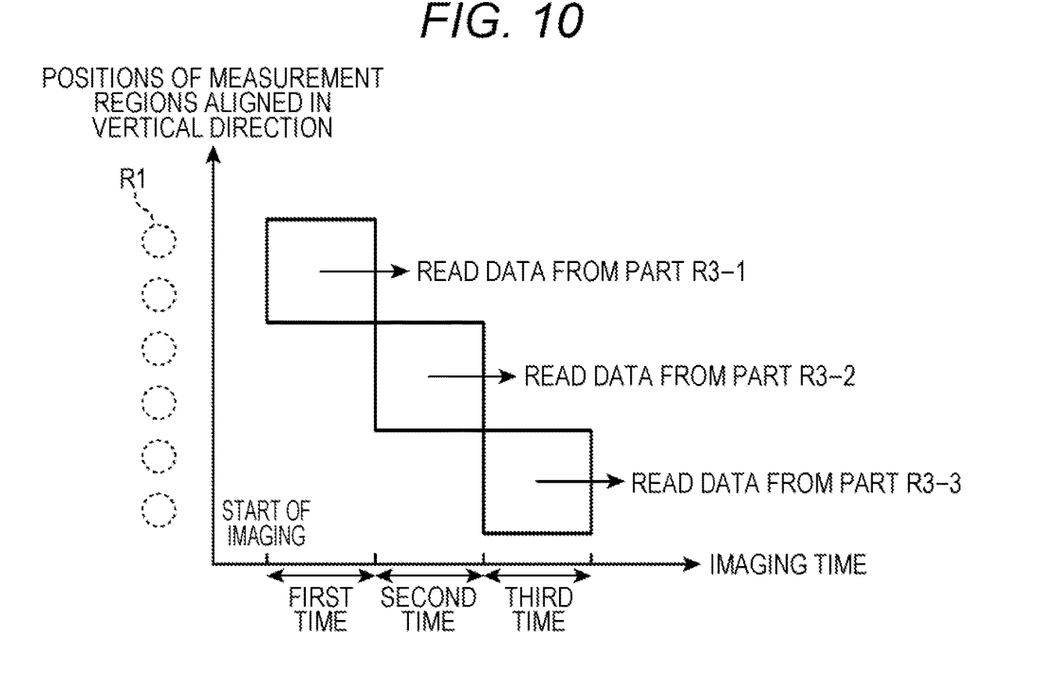
FIG. 10 is a diagram illustrating a time chart of three pieces of imaging using a partial reading function.

The control unit 332 causes the two-dimensional imaging device 32 to image the DUT screen 1 multiple times using a partial reading function under the frame rate set in step S5 (step S10 in FIG. 6). For these pieces of imaging, a global shutter is used. The number of times of imaging is the number of parts R3 set in step S7. Here, the number of times of imaging is three times. FIG. 10 is a diagram illustrating a time chart of three pieces of imaging using the partial reading function.

Referring to FIGS. 5, 9, and 10, the control unit 332 causes the two-dimensional imaging device 32 to perform first imaging of the DUT screen 1. In the first imaging, the two-dimensional imaging device 32 reads data (image information signal) from the part R3-1. This data includes the luminance signal SG indicating the luminance of the partial region R4-1. The luminance signal SG is transmitted to the control unit 332. Then, the control unit 332 causes the two-dimensional imaging device 32 to perform second imaging of the DUT screen 1. In the second imaging, the two-dimensional imaging device 32 reads data (image information signal) from the part R3-2. This data includes the luminance signal SG indicating the luminance of the partial region R4-2. The luminance signal SG is transmitted to the control unit 332. Then, the control unit 332 causes the two-dimensional imaging device 32 to perform third imaging of the DUT screen 1. In the third imaging, the two-dimensional imaging device 32 reads data (image information signal) from the part R3-3. This data includes the luminance signal SG indicating the luminance of the partial region R4-3. The luminance signal SG is transmitted to the control unit 332. The imaging times of the first imaging, second imaging, and third imaging are the above imaging times, and are the same value.

As described above, the control unit 332 causes the two-dimensional imaging device 32 to perform imaging multiple times using the partial reading function with the number of set parts R3 as the number of times of imaging, thereby acquiring the photometric quantity of each of the plurality of partial regions R4 corresponding to the plurality of parts R3.

Figure 11:
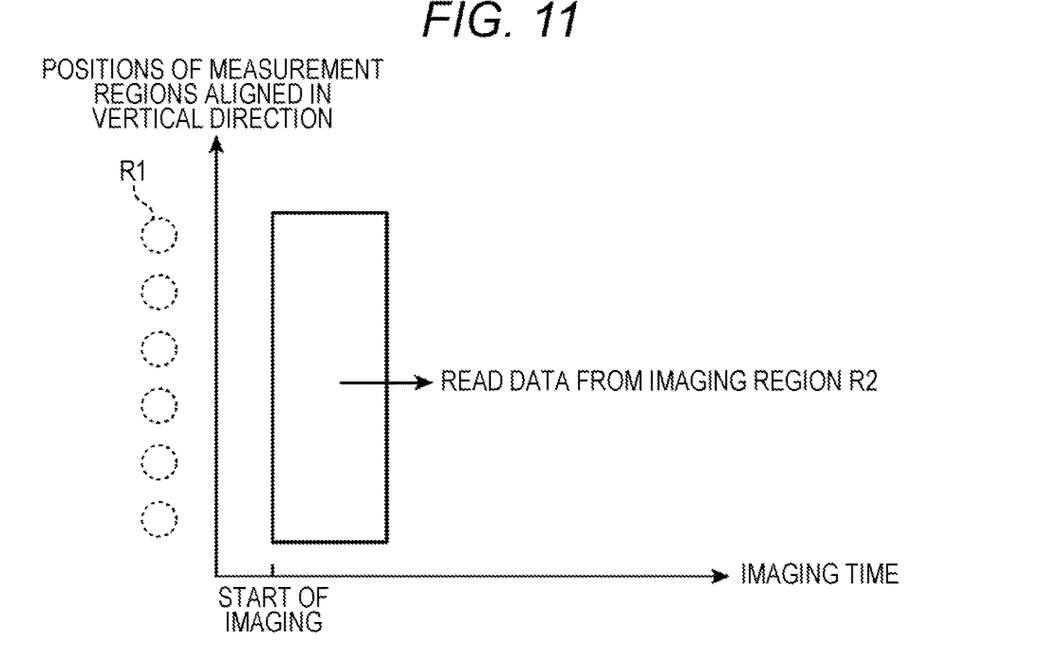
FIG. 11 is a diagram illustrating a time chart of imaging when a partial reading function is not used.

As a comparison, a case where the partial reading function is not used (that is, a case where data is read from the imaging region R2) will be described. FIG. 11 is a diagram illustrating a time chart of imaging when the partial reading function is not used. The number of times of imaging is one. The control unit 332 causes the two-dimensional imaging device 32 to image the DUT screen 1. In this imaging, the two-dimensional imaging device 32 reads data (image information signal) from the imaging region R2, and outputs the luminance signal SG indicating the luminance of the imaging region R2.

Referring to FIGS. 5 and 9, the calculation unit 333 calculates the flicker amount for the measurement region R1 included in each of three partial regions R4 (a plurality of partial regions R4) (step S11 in FIG. 6). Specifically, the calculation unit 333 calculates the flicker amount for each of all the measurement regions R1 included in the partial region R4-1 based on the luminance signal SG indicating the luminance of the partial region R4-1 described above. The calculation unit 333 calculates the flicker amount for each of all the measurement regions R1 included in the partial region R4-2 based on the luminance signal SG indicating the luminance of the partial region R4-2 described above. The calculation unit 333 calculates the flicker amount for each of all the measurement regions R1 included in the partial region R4-3 based on the luminance signal SG indicating the luminance of the partial region R4-3 described above.

The processing of the calculation unit 333 will be described in more detail by taking the partial region R4-1 as an example. The luminance signal SG of the partial region R4-1 includes the luminance signal SG of each of all the measurement regions R1 (16 measurement regions R1) included in the partial region R4-1. The calculation unit 333 calculates the flicker amount of the first measurement region R1 using the luminance signal SG indicating the luminance of the first measurement region R1, and calculates the flicker amount of the second measurement region R1 using the luminance signal SG indicating the luminance of the second measurement region R1. The calculation unit 333 similarly calculates the flicker amount for the third to sixteenth measurement regions R1.

As described above, the calculation unit 333 performs, for each of the plurality of partial regions R4, processing for calculating the flicker amounts of two or more measurement regions R1 included in the partial region R4 based on the photometric quantity of the partial region R4 acquired by the control unit 332.

Main effects of the embodiment will be described. The control unit 332 controls the two-dimensional imaging device 32 to image the DUT screen 1 multiple times using the number of parts R3 set in step S8 as the number of times of imaging. As the number of parts R3, in other words, the number of partial regions R4 increases, the number of times of imaging increases, and as a result, the flicker measurement time increases. A technical idea of performing partial reading for the 48 parts R3 corresponding to each of the 48 measurement regions R1 (the plurality of measurement regions R1) set on the DUT screen 1 can be considered. In this technical idea, the number of measurement regions R1 is the number of times of imaging. If the number of measurement regions R1 set on the DUT screen 1 is large, the flicker measurement time is long. On the other hand, according to the embodiment, since the partial region R4 includes 16 measurement regions R1 (two or more measurement regions R1), the number (3) of partial regions R4 is smaller than the number (48) of measurement regions R1. Therefore, in the embodiment, it is possible to reduce the number of times of imaging as compared with the above technical idea.

According to the partial reading function, even the normal two-dimensional imaging device 32 can perform imaging at a high frame rate. Then, since the luminance signal SG indicating the luminance of the partial region R4 corresponding to the part R3 (the luminance signal SG indicating the luminance of each of all the measurement regions R1 included in the partial region R4) is sampled using a high sampling frequency, the flicker amount of the measurement region R1 can be measured with high accuracy. Therefore, according to the embodiment, the flicker amount of each of the plurality of measurement regions R1 set on the DUT screen 1 can be measured with high accuracy using the two-dimensional imaging device 32.

If a high-speed camera is used, the DUT screen 1 can be imaged at a high frame rate. However, current high-speed cameras have the following problems. (1) High-speed cameras are expensive. (2) High-speed cameras generally require imaging with the large amount of light, and therefore have little influence of noise. However, when the amount of light is limited as in the measurement of the luminance of the DUT screen 1, the influence of noise increases. For this reason, since the reproducibility of the luminance signal SG is not good, the measurement accuracy of the flicker amount is not so high despite the high frame rate (high sampling frequency). According to the embodiment, even without using a high-speed camera, it is possible to perform imaging at a high frame rate by the partial reading function. However, it is possible to apply the partial reading function of the high-speed camera to the embodiment.

As described above, the calculation unit 333 adds up (binning) the luminance signals SG each indicating the luminance of a region corresponding to each of a plurality of pixels, and calculates the flicker amount of the measurement region R1 using the luminance signal SG obtained by the addition. If the phases of the luminance signals SG each indicating the luminance of the region corresponding to each of these pixels are shifted from each other, the waveform of the luminance signal SG obtained by the addition is distorted. Accordingly, the measurement accuracy of the flicker amount cannot be increased. In the embodiment, the partial region R4 is imaged using a global shutter (step S10 in FIG. 6). According to the global shutter, unlike a rolling shutter, all the pixels forming the imaging region R2 are exposed at the same time, so that the phases of the luminance signals SG can be aligned.

Modification examples of the embodiment will be described. A first modification example will be described. Referring to FIGS. 5 and 9, the setting unit 331 sets the three parts R3 (a plurality of parts R3) so that the three partial regions R4 (a plurality of partial regions R4) are arranged without a gap therebetween on the DUT screen 1. On the other hand, in the first modification example, the three partial regions R4 (a plurality of partial regions R4) are set with a gap therebetween on the DUT screen 1. Specifically, the measurer operates the PC 5 to make a setting for reducing the size in the vertical direction (column direction) for each of the three partial regions R4 (at this time, for each of the three partial regions R4, a size is set such that the measurement region R1 does not protrude from the partial region R4). The setting unit 331 corrects the address of each of the three parts R3 so as to correspond to the three partial regions R4 whose sizes have been reduced. According to the first modification example, the size of the part R3 can be reduced. Therefore, since the amount of data read from the part R3 can be reduced, it is possible to reduce the calculation load.

A second modification example will be described. In the embodiment, the setting unit 331 sets the measurement region R1 to a size having a positive correlation with the frame rate of partial reading set by the setting unit 331 (step S9 in FIG. 6). On the other hand, in the second modification example, the setting unit 331 measures the strength of the luminance signal SG output from the two-dimensional imaging device 32 by imaging the DUT screen 1 by the two-dimensional imaging device 32 under the frame rate of partial reading set by the setting unit 331, and sets the measurement region R1 to a size having a negative correlation with the measured strength. This will be described in detail below.

The negative correlation means that the size of the measurement region R1 decreases as the measured strength increases and the size of the measurement region R1 increases as the measured strength decreases.

The luminance signal SG output from the two-dimensional imaging device 32 is, for example, the luminance signal SG indicating the luminance of one measurement region R1 (the size of the measurement region R1 is set to an initial value) set on the DUT screen 1.

According to the second modification example, if the measured strength of the luminance signal SG is large, the size of the measurement region R1 is reduced. Therefore, the number of measurement regions R1 can be increased. As a result, the spatial resolution of the two-dimensional flicker measurement device 3 can be increased while ensuring the strength of the luminance signal SG necessary for calculating the flicker amount.

According to the second modification example, if the measured strength of the luminance signal SG is small, the size of the measurement region R1 is increased. As a result, it is possible to obtain the luminance signal SG having a strength necessary for calculating the flicker amount.

In addition, in the second modification example, the setting unit 331 may measure the strength of the luminance signal SG using the preview image in step S1, or may measure the strength of the luminance signal SG using the image of the partial region R4 in step S10. In the latter case, step S9 and step S10 are interchanged.

Figure 12:
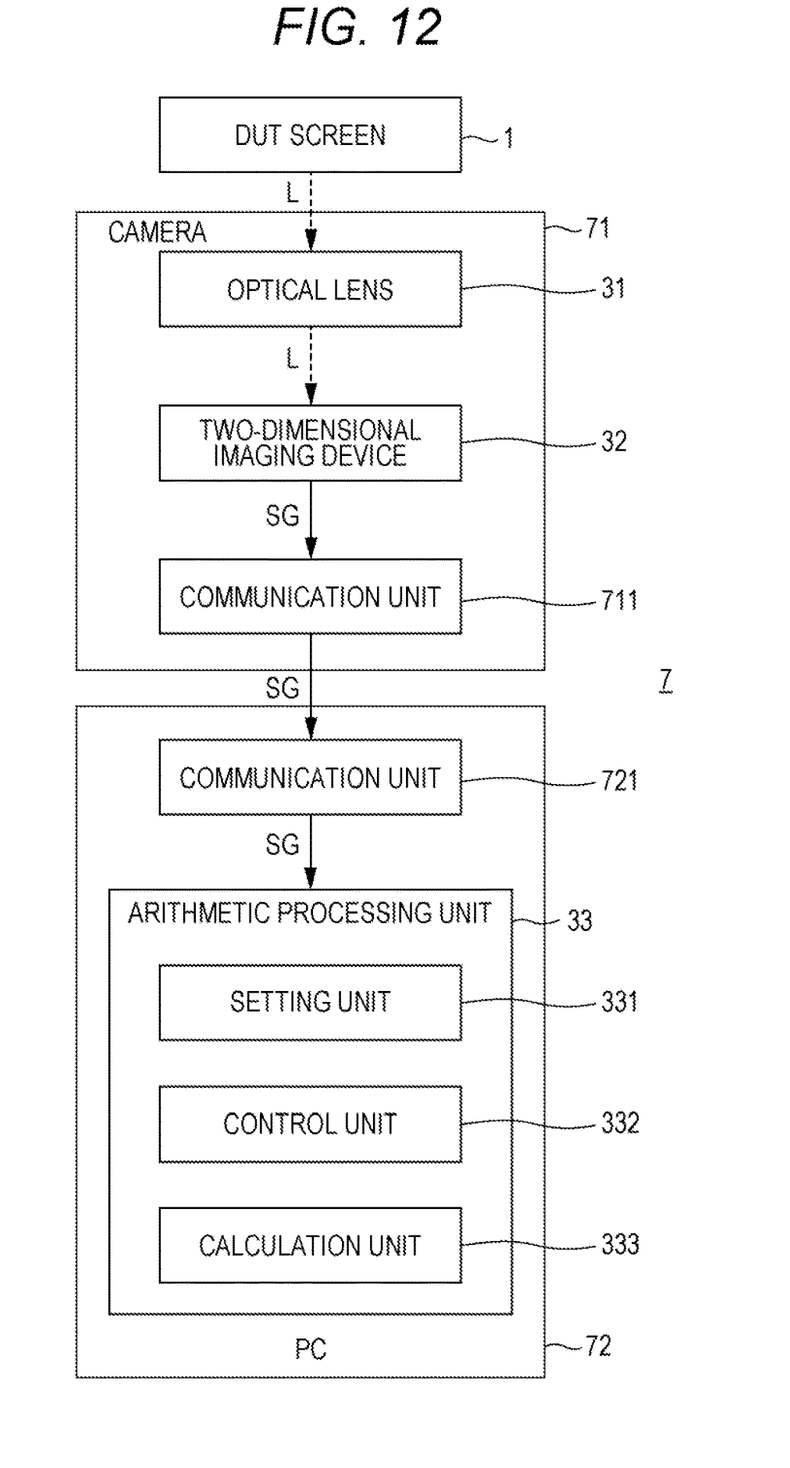
FIG. 12 is a block diagram illustrating the configuration of a two-dimensional flicker measurement system according to an embodiment.

A two-dimensional flicker measurement system according to an embodiment will be briefly described. FIG. 12 is a block diagram showing the configuration of a system 7. The two-dimensional flicker measurement system 7 includes a camera 71 and a PC 72. The camera 71 is a digital camera including an optical lens 31, a two-dimensional imaging device 32, and a communication unit 711. The camera 71 has the functions of the optical lens 31 and the two-dimensional imaging device 32 provided in the two-dimensional flicker measurement device 3 illustrated in FIG. 5. The communication unit 711 is a communication interface through which the camera 71 communicates with an external device. Here, the communication unit 711 transmits the luminance signal SG output from the two-dimensional imaging device 32 to the PC 72.

The PC 72 includes an arithmetic processing unit 33 and a communication unit 721. The PC 72 has the functions of the arithmetic processing unit 33 and the PC 5 illustrated in FIG. 5. The communication unit 721 is a communication interface through which the PC 72 communicates with an external device. Here, the communication unit 721 receives the luminance signal SG output from the communication unit 711 of the camera 71, and transmits the received luminance signal SG to the arithmetic processing unit 33.

Since the two-dimensional flicker measurement system 7 has the same configuration as the two-dimensional flicker measurement device 3, the two-dimensional flicker measurement system 7 has the same operation and effect as the two-dimensional flicker measurement device 3.

As a technical idea relevant to the embodiment, there is an idea of forming an image of the entire DUT screen 1 in the part R3 of the imaging region R2, acquiring the luminance signal SG of the entire DUT screen 1 from the part R3 by partial reading, and calculating the flicker amount of each of the plurality of measurement regions R1 based on the luminance signal SG.

However, this technical idea has the following problems. (1) Since the image of the entire DUT screen 1 is formed not in the imaging region R2 but in the part R3, the image of the entire DUT screen 1 is reduced. Therefore, since the amount of light is reduced, the SN ratio of the luminance signal SG is reduced. As a result, there is a problem that the measurement accuracy of the flicker amount is reduced. (2) In order to form an image of the entire DUT screen 1 in the part R3 of the imaging region R2, it is necessary to increase the distance between the two-dimensional imaging device 32 and the DUT screen 1 or to use a wide-angle lens. The former has a problem that the space necessary for measuring the flicker amount increases. In the latter case, there is a problem that the image of the entire DUT screen 1 is distorted.

Summary of Embodiments

A two-dimensional flicker measurement device according to a first aspect of the embodiment is a two-dimensional flicker measurement device for measuring a flicker amount of each of a plurality of measurement regions set in a measurement target, and includes: a two-dimensional imaging device having a partial reading function for reading a part of an imaging region; a setting unit that sets a plurality of the parts, which correspond to partial regions each of which includes two or more of the measurement regions, in the imaging region; a control unit that acquires a photometric quantity of each of the plurality of partial regions corresponding to the plurality of parts by causing the two-dimensional imaging device to image the measurement target multiple times using the partial reading function with the number of set parts as the number of times of imaging; and a calculation unit that executes processing, which is for calculating flicker amounts of the two or more measurement regions included in the partial region based on the acquired photometric quantity of the partial region, for each of the plurality of partial regions.

The partial region is a region set in the measurement target by setting a part of the imaging region by the setting unit. Since a plurality of parts are set in the imaging region, a plurality of partial regions are set in the measurement target. An image of the partial region is formed in the part. Using this, the photometric quantity of the partial region corresponding to the part is acquired.

The photometric quantity (brightness) is a physical quantity that generically refers to an image information signal and luminance The image information signal is a light intensity signal (RAW image data) generated by a two-dimensional imaging device when the two-dimensional imaging device having an arbitrary spectral sensitivity characteristic images a measurement target. The luminance is the light intensity of the measurement target measured by the two-dimensional imaging device having a spectral sensitivity characteristic of a visibility curve V (λ).

The control unit controls the two-dimensional imaging device to image the measurement target multiple times with the number of set parts as the number of times of imaging As the number of parts, in other words, the number of partial regions increases, the number of times of imaging increases, and as a result, the flicker measurement time increases. A technical idea of performing partial reading for a plurality of parts corresponding to a plurality of measurement regions set in the measurement target can be considered. In this technical idea, the number of measurement regions is the number of times of imaging. If the number of measurement regions set in the measurement target is large, the flicker measurement time is long. On the other hand, according to the two-dimensional flicker measurement device according to the first aspect of the embodiment, since the partial region includes two or more measurement regions, the number of partial regions (the number of parts) is smaller than the number of measurement regions. Therefore, in the two-dimensional flicker measurement device according to the first aspect of the embodiment, it is possible to reduce the number of times of imaging as compared with the above technical idea.

According to the partial reading function, even a normal two-dimensional imaging device can perform imaging at a high frame rate. Then, since a signal indicating the photometric quantity of a partial region corresponding to a part of the imaging region (a signal indicating the photometric quantity of each of all the measurement regions included in the partial region) is sampled using a high sampling frequency, the flicker amount of the measurement region can be measured with high accuracy. Therefore, according to the two-dimensional flicker measurement device according to the first aspect of the embodiment, the flicker amount of each of a plurality of measurement regions set in the measurement target can be measured with high accuracy using the two-dimensional imaging device.

In addition, when the photometric quantity is a luminance, the signal indicating the photometric quantity is a luminance signal. When the photometric quantity is an image information signal, the signal indicating the photometric quantity is an image information signal.

In the configuration described above, the setting unit sets a frame rate, at which a signal having a target frequency necessary for the calculation unit to calculate the flicker amount is reproducible, as a frame rate of the partial reading, and sets a value, which is obtained by dividing a size of the imaging region by a size of the part determined by the set frame rate of the partial reading, as the number of parts.

The frame rate at which it is possible to reproduce a signal having a target frequency necessary for the calculation unit to calculate the flicker amount (hereinafter, referred to as a reproduction frame rate) is, for example, a frame rate at which a signal indicating the photometric quantity of a partial region can be reproduced. Alternatively, the reproduction frame rate is a frame rate at which it is possible to reproduce, for example, an AC frequency component having a maximum strength among frequency components included in the signal indicating the photometric quantity.

In addition, when the value of the number of parts is a fraction, the value after the decimal point is rounded up (for example, in the case of 3.2, 4.0).

If there is a measurement region that is not included in the partial region among the plurality of measurement regions set in the measurement target, the calculation unit cannot calculate the flicker amount of the measurement region. In this configuration, a value obtained by dividing the size of the imaging region by the size of the part of the imaging region is set as the number of parts (the number of parts=imaging region size/size of a part). The number of parts is the number of partial regions. For this reason, the measurement target is virtually equally divided, and each divided part is the partial region. In this aspect, since each of the plurality of measurement regions set in the measurement target is included in any of the partial regions, the flicker amount can be calculated for all of the plurality of measurement regions.

In order to calculate the flicker amount of the partial region, the frame rate of partial reading needs to be the above-described reproduction frame rate. In this configuration, a value obtained by dividing the size of the imaging region by the size of the part of the imaging region determined by the reproduction frame rate is set as the number of parts (the number of partial regions). Therefore, it is possible to calculate the flicker amount of the partial region, and it is possible to calculate the flicker amount for all of the plurality of measurement regions set in the measurement target as described above.

In the configuration described above, when generating a power spectrum by performing a fast Fourier transform on a signal indicating the acquired photometric quantity of the partial region, the calculation unit sets an integer to divide the target frequency, among frequencies of frequency components included in the signal indicating the acquired photometric quantity of the partial region, as a frequency pitch of the power spectrum.

According to this configuration, among the frequencies of the frequency components included in the signal indicating the acquired photometric quantity of the partial region, the target frequency (for example, a frequency of an AC frequency component having a maximum strength) can be included in the power spectrum. For example, when the target frequency is 20 Hz, if the frequency pitch is set to 5 Hz, the power spectrum can include a 20 Hz spectrum. Therefore, this configuration is suitable for the JEITA method.

In the configuration described above, the setting unit sets the measurement region to a size having a positive correlation with the set frame rate of the partial reading The following explanation will be given using a luminance signal, but an image information signal may be used.

This configuration is an example of a method for determining the size of a measurement region. The positive correlation means that the size of the measurement region increases as the frame rate increases and the size of the measurement region decreases as the frame rate decreases.

In the imaging region of the two-dimensional imaging device, a location where the image of the measurement region is formed is not a single pixel but a plurality of pixels. The calculation unit adds up (binning) luminance signals each indicating the luminance of a region corresponding to each of these pixels, and calculates the flicker amount of the measurement region using the luminance signal obtained by the addition. If the strength of the luminance signal indicating the luminance of the region corresponding to each of these pixels is low, the SN ratio is low. Accordingly, the measurement accuracy of the flicker amount cannot be increased.

If the frame rate of partial reading is high, the exposure time of a part of the imaging region becomes short. For this reason, when the size of the measurement region is small, the strength of the luminance signal obtained by the above addition is low. Therefore, the luminance signal having a strength necessary for calculating the flicker amount cannot be obtained. On the other hand, if the frame rate of partial reading is low, the exposure time of a part of the imaging region becomes long. For this reason, even if the size of the measurement region is small, the strength of the luminance signal obtained by the above addition is high. Therefore, the luminance signal having a strength necessary for calculating the flicker amount can be obtained.

According to this configuration, if the frame rate of partial reading is high, the size of the measurement region is increased. Therefore, even if the frame rate of the partial reading is high, it is possible to obtain the luminance signal having a strength necessary for calculating the flicker amount.

If the number of measurement regions is large, the spatial resolution of the two-dimensional flicker measurement device can be increased. As a result, for example, it is possible to evaluate the flicker unevenness of the display screen more accurately. According to this configuration, if the frame rate of partial reading is low, the size of the measurement region is reduced. Therefore, when the frame rate of partial reading is low, the number of measurement regions can be increased, so that the spatial resolution of the two-dimensional flicker measurement device can be increased.

In the configuration described above, the setting unit measures a strength of a signal indicating a photometric quantity output from the two-dimensional imaging device by imaging the measurement target by the two-dimensional imaging device under the set frame rate of the partial reading, and sets the measurement region to a size having a negative correlation with the measured strength. Hereinafter, a luminance signal will be described as an example of the signal indicating the photometric quantity. However, an image information signal may be used.

This configuration is another example of the method for determining the size of a measurement region. The negative correlation means that the size of the measurement region decreases as the measured strength increases and the size of the measurement region increases as the measured strength decreases.

The luminance signal output from the two-dimensional imaging device is, for example, a luminance signal indicating the luminance of one measurement region (the size of the measurement region is set to an initial value) set in the measurement target.

According to this configuration, if the measured strength of the luminance signal is large, the size of the measurement region is reduced. Therefore, the number of measurement regions can be increased. As a result, the spatial resolution of the two-dimensional flicker measurement device can be increased while ensuring the strength of the luminance signal necessary for calculating the flicker amount.

According to this configuration, if the measured strength of the luminance signal is small, the size of the measurement region is increased. As a result, it is possible to obtain the luminance signal having a strength necessary for calculating the flicker amount.

In the configuration described above, the two-dimensional imaging device has a global shutter function, and the control unit controls the two-dimensional imaging device to image the measurement target multiple times using the global shutter function. The following explanation will be given using a luminance signal, but an image information signal may be used.

As described above, the calculation unit adds up (binning) the luminance signals each indicating the luminance of a region corresponding to each of a plurality of pixels, and calculates the flicker amount of the measurement region using the luminance signal obtained by the addition. If the phases of the luminance signals each indicating the luminance of the region corresponding to each of these pixels are shifted from each other, the waveform of the luminance signal obtained by the addition is distorted. Accordingly, the measurement accuracy of the flicker amount cannot be increased. According to the global shutter, unlike a rolling shutter, all the pixels forming the imaging region are exposed at the same time, so that the phases of the luminance signals can be aligned.

A two-dimensional flicker measurement system according to a second aspect of the embodiment is a two-dimensional flicker measurement system for measuring a flicker amount of each of a plurality of measurement regions set in a measurement target, and includes: a camera including a two-dimensional imaging device having a partial reading function for reading a part of an imaging region; a setting unit that sets a plurality of the parts, which correspond to partial regions each of which includes two or more of the measurement regions, in the imaging region; a control unit that acquires a photometric quantity of each of the plurality of partial regions corresponding to the plurality of parts by causing the two-dimensional imaging device to image the measurement target multiple times using the partial reading function with the number of set parts as the number of times of imaging; and a calculation unit that executes processing, which is for calculating flicker amounts of the two or more measurement regions included in the partial region based on the acquired photometric quantity of the partial region, for each of the plurality of partial regions.

The setting unit, the control unit, and the calculation unit may be included in one device or may be included in separate devices. The former is, for example, a computer device including a setting unit, a control unit, and a calculation unit. The latter is, for example, a computer device including a setting unit, a computer device including a control unit, and a computer device including a calculation unit.

The two-dimensional flicker measurement system according to the second aspect of the embodiment defines the two-dimensional flicker measurement device according to the first aspect of the embodiment from the viewpoint of a system, and has the same operation and effect as the two-dimensional flicker measurement device according to the first aspect of the embodiment.

A two-dimensional flicker measurement method according to a third aspect of the embodiment is a two-dimensional flicker measurement method for measuring a flicker amount of each of a plurality of measurement regions set in a measurement target using a two-dimensional imaging device having a partial reading function for reading a part of an imaging region, and includes: a setting step of setting a plurality of the parts, which correspond to partial regions each of which includes two or more of the measurement regions, in the imaging region; a control step of acquiring a photometric quantity of each of the plurality of partial regions corresponding to the plurality of parts by causing the two-dimensional imaging device to image the measurement target multiple times using the partial reading function with the number of set parts as the number of times of imaging; and a calculation step of executing processing, which is for calculating flicker amounts of the two or more measurement regions included in the partial region based on the acquired photometric quantity of the partial region, for each of the plurality of partial regions.

The two-dimensional flicker measurement method according to the third aspect of the embodiment defines the two-dimensional flicker measurement device according to the first aspect of the embodiment from the viewpoint of a method, and has the same operation and effect as the two-dimensional flicker measurement device according to the first aspect of the embodiment.

A two-dimensional flicker measurement program according to a fourth aspect of the embodiment is a two-dimensional flicker measurement program for measuring a flicker amount of each of a plurality of measurement regions set in a measurement target using a two-dimensional imaging device having a partial reading function for reading a part of an imaging region. The two-dimensional flicker measurement program causes a computer to execute: a setting step of setting a plurality of the parts, which correspond to partial regions each of which includes two or more of the measurement regions, in the imaging region; a control step of acquiring a photometric quantity of each of the plurality of partial regions corresponding to the plurality of parts by causing the two-dimensional imaging device to image the measurement target multiple times using the partial reading function with the number of set parts as the number of times of imaging; and a calculation step of executing processing, which is for calculating flicker amounts of the two or more measurement regions included in the partial region based on the acquired photometric quantity of the partial region, for each of the plurality of partial regions.

The two-dimensional flicker measurement program according to the fourth aspect of the embodiment defines the two-dimensional flicker measurement device according to the first aspect of the embodiment from the viewpoint of a program, and has the same operation and effect as the two-dimensional flicker measurement device according to the first aspect of the embodiment.

In addition, the two-dimensional flicker measurement device according to the first aspect of the embodiment described above is expressed as follows when the photometric quantity is a luminance. The two-dimensional flicker measurement device is a two-dimensional flicker measurement device for measuring a flicker amount of each of a plurality of measurement regions set in a measurement target, and includes: a two-dimensional imaging device having a partial reading function for reading a part of an imaging region; a setting unit that sets a plurality of the parts, which correspond to partial regions each of which includes two or more of the measurement regions, in the imaging region; a control unit that performs control to read a luminance signal from each of the plurality of parts by causing the two-dimensional imaging device to image the measurement target multiple times using the partial reading function with the number of the plurality of parts as the number of times of imaging; and a calculation unit that executes processing, which is for calculating flicker amounts of the two or more measurement regions included in the partial region corresponding to the part based on the luminance signal read from the part, for each of the plurality of partial regions corresponding to the plurality of parts.

While the embodiment of the present invention has been shown and described in detail, this is merely an illustration and an example and the present invention is not limited thereto. The scope of the present invention should be interpreted in accordance with the appended claims.

The entire disclosure of Japanese Patent Application No. 2017-195104 filed on Oct. 5, 2017 and Japanese Patent Application No. 2017-198964 filed on Oct. 13, 2017 is incorporated herein by reference in its entirety.

INDUSTRIAL APPLICABILITY

According to the present invention, it is possible to provide a two-dimensional flicker measurement device, a two-dimensional flicker measurement system, a two-dimensional flicker measurement method, and a two-dimensional flicker measurement program.

The invention claimed is:

1. A two-dimensional flicker measurement device for measuring a flicker amount of each of a plurality of measurement regions set in a measurement target, comprising:
a two-dimensional imaging device having a partial reading function for reading a part of an imaging region; and
a hardware processor that sets a plurality of the parts, which correspond to partial regions each of which includes two or more of the measurement regions, in the imaging region,
acquires a photometric quantity of each of the plurality of partial regions corresponding to the plurality of parts by causing the two-dimensional imaging device to image the measurement target multiple times using the partial reading function with the number of set parts as the number of times of imaging, and
executes processing, which is for calculating flicker amounts of the two or more measurement regions included in the partial region based on the acquired photometric quantity of the partial region, for each of the plurality of partial regions.

2. The two-dimensional flicker measurement device according to claim 1, wherein the hardware processor sets a frame rate, at which a signal having a target frequency necessary to calculate the flicker amount is reproducible, as a frame rate of the partial reading, and sets a value, which is obtained by dividing a size of the imaging region by a size of the part determined by the set frame rate of the partial reading, as the number of parts.

3. The two-dimensional flicker measurement device according to claim 2, wherein, when generating a power spectrum by performing a fast Fourier transform on a signal indicating the acquired photometric quantity of the partial region, the hardware processor sets an integer to divide the target frequency, among frequencies of frequency components included in the signal indicating the acquired photometric quantity of the partial region, as a frequency pitch of the power spectrum.

4. The two-dimensional flicker measurement device according to claim 3, wherein the hardware processor sets the measurement region to a size having a positive correlation with the set frame rate of the partial reading.

5. The two-dimensional flicker measurement device according to claim 3, wherein the hardware processor measures a strength of a signal indicating a photometric quantity output from the two-dimensional imaging device by imaging the measurement target by the two-dimensional imaging device under the set frame rate of the partial reading, and sets the measurement region to a size having a negative correlation with the measured strength.

6. The two-dimensional flicker measurement device according to claim 3, wherein the two-dimensional imaging device has a global shutter function, and the hardware processor controls the two-dimensional imaging device to image the measurement target multiple times using the global shutter function.

7. The two-dimensional flicker measurement device according to claim 2, wherein the hardware processor sets the measurement region to a size having a positive correlation with the set frame rate of the partial reading.

8. The two-dimensional flicker measurement device according to claim 7, wherein the two-dimensional imaging device has a global shutter function, and
the hardware processor controls the two-dimensional imaging device to image the measurement target multiple times using the global shutter function.

9. The two-dimensional flicker measurement device according to claim 2, wherein the hardware processor measures a strength of a signal indicating a photometric quantity output from the two-dimensional imaging device by imaging the measurement target by the two-dimensional imaging device under the set frame rate of the partial reading, and sets the measurement region to a size having a negative correlation with the measured strength.

10. The two-dimensional flicker measurement device according to claim 9, wherein the two-dimensional imaging device has a global shutter function, and
the hardware processor controls the two-dimensional imaging device to image the measurement target multiple times using the global shutter function.

11. The two-dimensional flicker measurement device according to claim 2, wherein the two-dimensional imaging device has a global shutter function, and
the hardware processor controls the two-dimensional imaging device to image the measurement target multiple times using the global shutter function.

12. The two-dimensional flicker measurement device according to any one claim 1, wherein the two-dimensional imaging device has a global shutter function, and
the hardware processor controls the two-dimensional imaging device to image the measurement target multiple times using the global shutter function.

13. A two-dimensional flicker measurement system for measuring a flicker amount of each of a plurality of measurement regions set in a measurement target, comprising:
a camera including a two-dimensional imaging device having a partial reading function for reading a part of an imaging region; and
a hardware processor that sets a plurality of the parts, which correspond to partial regions each of which includes two or more of the measurement regions, in the imaging region,
acquires a photometric quantity of each of the plurality of partial regions corresponding to the plurality of parts by causing the two-dimensional imaging device to image the measurement target multiple times using the partial reading function with the number of set parts as the number of times of imaging, and
executes processing, which is for calculating flicker amounts of the two or more measurement regions included in the partial region based on the acquired photometric quantity of the partial region, for each of the plurality of partial regions.

14. A two-dimensional flicker measurement method for measuring a flicker amount of each of a plurality of measurement regions set in a measurement target using a two-dimensional imaging device having a partial reading function for reading a part of an imaging region, the method comprising:
setting a plurality of the parts, which correspond to partial regions each of which includes two or more of the measurement regions, in the imaging region;
acquiring a photometric quantity of each of the plurality of partial regions corresponding to the plurality of parts by causing the two-dimensional imaging device to image the measurement target multiple times using the partial reading function with the number of set parts as the number of times of imaging; and
executing processing, which is for calculating flicker amounts of the two or more measurement regions included in the partial region based on the acquired photometric quantity of the partial region, for each of the plurality of partial regions.

15. A non-transitory recording medium storing a computer readable two-dimensional flicker measurement program for measuring a flicker amount of each of a plurality of measurement regions set in a measurement target using a two-dimensional imaging device having a partial reading function for reading a part of an imaging region, the program causing a computer to execute:
setting a plurality of the parts, which correspond to partial regions each of which includes two or more of the measurement regions, in the imaging region;
acquiring a photometric quantity of each of the plurality of partial regions corresponding to the plurality of parts by causing the two-dimensional imaging device to image the measurement target multiple times using the partial reading function with the number of set parts as the number of times of imaging; and
executing processing, which is for calculating flicker amounts of the two or more measurement regions included in the partial region based on the acquired photometric quantity of the partial region, for each of the plurality of partial regions.

* * * * *